May 27, 1952  W. W. HAMILL  2,598,164
DIFFERENTIAL INERTIA SPEED RESPONSIVE DEVICE
Filed July 2, 1945

Inventor
William Wilson Hamill
By
William A. Davis
Attorney

Patented May 27, 1952

2,598,164

UNITED STATES PATENT OFFICE 2,598,164

DIFFERENTIAL INERTIA SPEED
RESPONSIVE DEVICE

William Wilson Hamill, Little Aston, England

Application July 2, 1945, Serial No. 602,874
In Great Britain July 31, 1944

3 Claims. (Cl. 264—11)

This invention relates to a method of and means for regulating, controlling, or governing speeds of rotation of revolving bodies, e. g., engines, mechanisms, etc.

The invention consists in the utilisation of speed differential between two rotors one of which is driven to revolve at substantially constant speed while the other is driven to revolve at the speed of the controlled body or at a speed having a direct relation thereto, as by gearing up or gearing down. A change of speed of revolution of the controlled body in relation to the speed of revolution of the constant speed rotor is thus accompanied by a differential which is immediately available for actuating the control device which regulates the rotational velocity of the controlled body. Such mechanical lag or overrun as the case may be, can be arranged to provide ample power for overcoming the frictional and/or other resistances in the actuating mechanism of the control device the specific form of which device varies according to the particular application of the invention e. g. throttle, valve, fuel pump, rheostat, brake. Means according to the invention have the characteristics of high sensitivity, immediate response, and abundance of operating power, combined in constructions of extreme simplicity, compactness and reliability.

The invention further consists in two rotors driven as aforesaid, and means movable by speed differential therebetween said movable means including one or more surfaces inclined to the plane of rotation of the rotors and arranged to co-act with and move a part adapted for operative connection to the control device.

Other features of the invention are more particularly pointed out in the appended claims.

Figure 1:
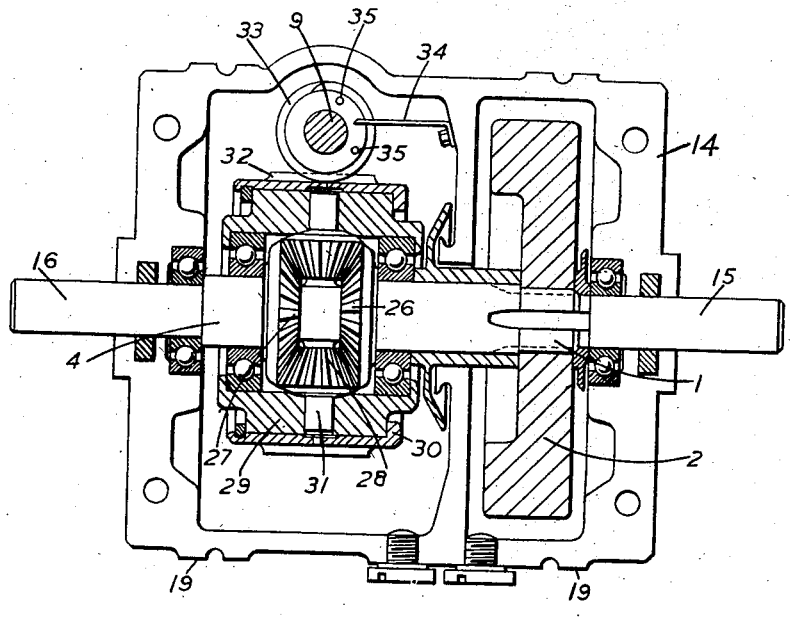
Figure 2:
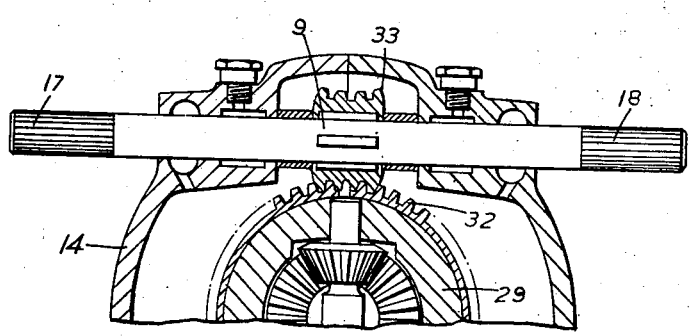

Reference may be had to the accompanying drawing in which:

Figure 1 is a sectional elevation of an arrangement embodying an epicyclic gear of the bevel wheel type, and Figure 2 is a sectional end view of the upper part of the mechanism included in Figure 1.

In one convenient embodiment incorporating an epicyclic train, one element of which is subject to movement to accompany speed differential of the rotors, being so arranged that when the controlled body gains or loses speed, the element is displaced about its axis of rotation. Such movement is transmitted by any suitable means to the control device by which the speed of the controlled body is regulated to decrease or increase its speed of revolution until the latter speed coincides with that of the constant speed rotor under which condition the rotors rotate at a common velocity and the control device remains static.

In the construction shown in Figures 1 and 2, the constant speed rotor 1, including a flywheel 2, and the other rotor 4 are coaxially journalled in a casing 14 and a rockshaft 9 is journalled transversely in said casing. The epicyclic train is interposed between the rotors 1 and 2 and any convenient means are employed for transmitting the movement of the train element to the control member operating mechanism through the rockshaft 9.

With the object of attaining as close as may be absolute constancy of speed of the constant speed rotor, the flywheel mass is driven at high speed so that its momentum avoids sensible change in angular velocity of the rotor when the nut and screw engage or disengage or relative motion occurs between them to operate the control member. Accordingly, the rotors are driven where practicable at a speed approximating to that of the fastest rotating part of the e. g. engine, or conveniently an amplifying gearing is introduced into the transmission from engine to the varying speed rotor or included in the rotor casing or incorporated with the rotor.

For convenience in installing, the preferred construction includes a casing 14 having end walls through which protrude symmetrically the two rotor shafts 15, 16; peripheral walls through which protrude symmetrically the two ends 17, 18 of the transverse rockshaft 9 wherefrom operating motion is taken to the control member; and a locating facing 19 of circular shape near each end of the peripheral wall, also symmetrically arranged. The rockshaft ends thus have a range of adjustment of angular position of 360°.

The rate of recovery or restoration of the controlled body to the standard determined by the constant speed rotor will vary according to the particular application of the invention; it may be high by the use of such means as multiple lead threads of high velocity ratio or by other gearing having that characteristic, or low by employing fine-pitched threads, worm and wheel, or other high mechanical advantage devices. Further, depending on the application of, for example, prime movers, process machinery, automatic control mechanism, divergent use appliances, the construction and arrangement and the size of the parts will correspondingly and appropriately vary.

The preferred expedient for utilising the speed differential resides in an epicyclic train or trains in which one of the members is static when the speeds of the constant speed rotor and the varying speed rotor are coincident, but which absorbs speed differential by movement about an axis. Such epicyclic gearing may be arranged in a variety of ways, one convenient arrangement of which will now be described.

In a preferred embodiment, bevel epicyclic gearing may be employed in which modification according to the arrangement shown in Figures 1 and 2, a bevel wheel 26 is fast with the constant speed rotor 1, another bevel wheel 27 is fast with the varying speed rotor 4, and two or more bevel planets 28 are mounted on the planet carrier 29, the latter having an outer ring 30 and a radial transverse shaft 31 on which the planets revolve. In one arrangement for transmitting the orbital motion to the rockshaft 9, skew gearing is embodied including threads or teeth 32 on the periphery of the ring 30 which mesh with teeth on a wheel or segments 33 but disengage therefrom outside the boundaries of a given angular displacement with re-engagement by spring pressure conveniently applied through the medium of a blade spring 34 and abutments 35 on the wheel 33. Speed differential is resolved by orbital motion of the carrier, but in Figure 1 the two rotors, in normal operations, revolve at a common speed.

A characteristic of the apparatus described is that the control member, e. g., throttle of an engine, is left in the full open or equivalent position when the engine or other body is stopping since the amount of differential is then at its highest.

By the expression "constant speed" used herein is meant a constancy of speed of revolution at the particular height or datum selected either permanently for a given purpose or application or for the time being or for a specific but transient condition of operation. Where variancy of the operating level is desired, any suitable means may be employed for adjusting the controlling speed of the constant speed rotor e. g. where the rotor is driven by electric motor, it may conveniently be of the variable speed type with rheostat or potentiometer control.

Since apparatus according to the invention is virtually free from the disturbing effects of the governor parts under rapid fluctuations of load and/or speed of the controlled body, in which freedom it possesses advantage over and is distinguished from the centrifugal type of governor, accurate correction and immediate adjustment under such fluctuating conditions are made of the control organ of the controlled body and consequentially the angular velocity of both rotors is held sensibly constant at the selected speed level. Where differential occurs between the rotors, each revolution thereof produces immediately as a primary effect a positive displacement of the control organ corresponding in control magnitude and sign to the load and/or speed variation of the controlled body, and thus maintains as closely as may be, the selected speed of revolution of the controlled body.

Having thus described my invention, what I claim is:

1. A device for controlling speeds of rotation of revolving bodies, comprising a constant speed rotor having a flywheel mass unitarily incorporated therewith, a controlled rotor to be driven to revolve at a speed having a direct relation to said constant speed rotor, a control mechanism for controlling said controlled rotor, an epicyclic train coupling said rotors and having one member movable about an axis when differential is set up between the rotors, means for transmitting movement of said member to said control mechanism and including gearing which disengages beyond the boundaries of a given angular displacement of one element of the gearing, and spring means for re-engaging said gearing.

2. A device as defined in claim 1 wherein said transmitting means gearing comprises a gear element mounted on a rock shaft, said gear element having a pair of angularly spaced abutments, and said spring means comprises a blade spring fixed at one end and having its free end interposed between said abutments.

3. A device for controlling speeds of rotation of revolving bodies, comprising a casing, a constant speed rotor including a unitarily assembled flywheel mass, a controlled rotor to be driven to revolve at a speed having a direct relation to said constant speed rotor, the speeds of rotation of the two rotors being coincident at the desired speed of revolution of the controlled rotor, a shaft for each of said rotors, said rotor shafts being journalled in said casing in axial alignment and with their outer ends protruding beyond said casing to provide couplings, a rock shaft extending through said casing transversely of said rotor shafts and with its ends protruding beyond the walls of said casing to provide coupling ends for connection to means for controlling said controlled rotor, an epicyclic train connected between said rotors and their shafts to be subject to speed differential between the two rotors, one member of the train being movable about an axis when differential is set up between the rotors, means for transmitting movement of said member to said rock shaft and including gearing which disengages beyond the boundaries of a given angular displacement of one element of the gearing that is mounted on said rock shaft, spaced abutments on said one gearing element, and a blade spring fixed to said casing and extending between said abutments for re-engaging said gearing.

WILLIAM WILSON HAMILL.

REFERENCES CITED

The following references are of record in the file of this patent:

UNITED STATES PATENTS

| Number | Name | Date |
|---|---|---|
| 233,734 | Crane | Oct. 26, 1880 |
| 502,557 | Doolittle | Aug. 1, 1893 |
| 835,396 | Campbell | Nov. 6, 1906 |
| 865,082 | Cassel | Sept. 3, 1907 |
| 967,443 | Sahlin | Aug. 6, 1910 |
| 1,709,673 | Kintzing | Apr. 16, 1929 |
| 1,749,569 | De Florez | Mar. 4, 1930 |
| 1,959,786 | Hodgkinson | May 22, 1934 |
| 2,294,469 | Loeffler | Sept. 1, 1942 |

FOREIGN PATENTS

| Number | Country | Date |
|---|---|---|
| 15,565 | Great Britain | Oct. 15, 1903 |
| 217,178 | Germany | Dec. 21, 1909 |